(12) United States Patent
Davies

(10) Patent No.: US 9,346,976 B2
(45) Date of Patent: May 24, 2016

(54) MINING RELEASE AGENT

(76) Inventor: Michael C. Davies, San Clemente, CA (US)

( * ) Notice: Subject to any disclaimer, the term of this patent is extended or adjusted under 35 U.S.C. 154(b) by 361 days.

(21) Appl. No.: 13/175,742

(22) Filed: Jul. 1, 2011

(65) Prior Publication Data

US 2013/0000515 A1    Jan. 3, 2013

(51) Int. Cl.
    *C09D 191/00*      (2006.01)
(52) U.S. Cl.
    CPC .................................. *C09D 191/00* (2013.01)
(58) Field of Classification Search
    None
    See application file for complete search history.

(56) References Cited

U.S. PATENT DOCUMENTS

| | | | |
|---|---|---|---|
| 5,494,502 A * | 2/1996 | DeLong | 106/2 |
| 6,022,833 A | 2/2000 | Mueller | |
| 6,485,651 B1 | 11/2002 | Branning | |
| 6,902,606 B1 | 6/2005 | Davies | |
| 2006/0018968 A1 * | 1/2006 | Melbouci | 424/488 |
| 2006/0270569 A1 | 11/2006 | Athans | |
| 2008/0026954 A1 | 1/2008 | Wu | |
| 2008/0217064 A1 | 9/2008 | Stoian | |
| 2009/0145459 A1 | 6/2009 | Gonzales | |

* cited by examiner

*Primary Examiner* — Colin W Slifka
(74) *Attorney, Agent, or Firm* — Fish & Tsang LLP

(57) ABSTRACT

A release agent for use on mining and mineral processing equipment that eliminate or significantly reduces sticking and freezing of ore and mining materials during excavation, transportation, and processing. The release agent is comprised of a mixture of natural oils such as crude degummed soybean oil and a surfactant such as Lutensol®.

5 Claims, No Drawings

MINING RELEASE AGENT

CROSS REFERENCE TO RELATED APPLICATIONS

None

STATEMENT REGARDING FEDERALLY-SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The mining and mineral processing industries are constantly presented with the difficult question of how to more efficiently locate and process valuable minerals. A major factor adding to the difficulty in this task is that the desired minerals and ore are almost always buried beneath tons of non-valuable material that must first be removed and carried away from the dig site. This material, often called "overburden" in the industry commonly consists of wet mud, clay, and the like which is very heavy and tends to stick to mining equipment.

It is an object of this invention to provide a slip coating for use in the mining and mineral processing industries to help alleviate the problems associated with overburden. In particular, the slip coating described herein is applied to mining equipment to prevent materials from sticking or freezing to the equipment. The invention incorporates naturally occurring oils and a commercially available surfactant in a new mixture that has properties desirable for use in the mining and mineral processing industries.

Prior art products have ingredients that are undesirable, either for their effect on the mining material being processed, or for their effect on the environment. For example, many prior art products include water or yellow grease #2, both of which have serious drawbacks as described herein. The present invention represents an improvement over the prior in that it provides a more efficient, biodegradable slip coating for use in the mining and mineral processing industries, with none of the negative properties found in prior art products.

BRIEF SUMMARY OF THE INVENTION

The present invention discloses an industrial process liquid suitable for use in the mining and mineral processing industries. More particularly, the invention is a fluid mixture made up of a natural oil combined with a surfactant, which is then applied to mining equipment and mineral processing equipment for the purpose of preventing mining materials from sticking to the equipment during operation. As used in this description, "mining materials" refers to ore, ore concentrate, coal, clay, mud, and other materials of the kind that are commonly encountered during mining operations. "Mining equipment" refers to equipment used in mining and mineral processing operations, including mining haul truck trays, truck undercarriages, rail cars, earthmoving equipment (scoop trams, excavators, loaders, shovels, etc.), tracked vehicles, chutes, and conveyors. The examples used in the above definitions are intended to give a general idea of the terms and are not intended to limit the definitions to only those specific examples called out. Indeed, there may be other types of mining materials or mining equipment that are relevant to this invention that are nonetheless not included in the illustrative list provided here.

The nature of mining operations is such that extraction of valuable ore requires the movement of large amounts of clay, mud, and other mining materials along with the ore. Often, the mining material is wet or tacky. Those in the mining and mineral processing industries are familiar with the term "overburden" which describes the often viscous muck that must be removed from a location before the valuable minerals and ore can be extracted. The nature of the overburden is such that it has a tendency to stick to the diggers, trucks, and other excavation equipment as it is being removed. In some situations, such as in high altitude or arctic mining operations, the mining material (both overburden and the targeted minerals) may even freeze to the mining equipment. This scenario is particularly common in cold weather coal mining operations in which coal will freeze to train cars during transport.

Mining material is extracted using one piece of equipment (such as an excavator), transferred using another (such as a front-end loader) and transported using other equipment (such as heavy trucks, carts, or trains), and finally processed using yet another set of equipment. At each step of the process, the mining material—including the valuable ore being mined—can build up on the equipment. This build up is a problem in that it interferes with the normal operation of the equipment, and, in the case of ore or targeted minerals being accumulated on the equipment, results in a loss of profitable material. Buildup of mining material on mining equipment thus adds to the cost of mining and mineral processing because it adds cost and delay in the form of extra maintenance and cleaning costs, lost product, and additional man-hours.

It is an object of this invention to provide an industrial fluid made from non-hazardous, biodegradable materials that prevents or substantially lessens instances of mining material sticking or freezing to mining and mineral processing equipment. An additional benefit found in this invention is that it uses relatively low-cost materials that have desirable physical and chemical properties, as described below. These desirable properties stand in stark contrast to the deleterious effects that come from prior art products.

A number of prior art release agents, such as the one described in U.S. Pat. No. 6,902,606, incorporate water. As described above, mining operations often take place in cold temperatures, which makes freezing a problem. And, even when the temperature is not freezing, the overburden often will have a high water content, which causes much of the sticking. Thus, the use of water in the prior art products would often serve to multiply the freezing and sticking problems that the release agent is intended to solve.

Similarly, many prior art products incorporate yellow grease or tallow as part of the release agent, which ingredients have their own problems. Products incorporating yellow grease often lack consistency due to the varied sources of yellow grease used. One source of yellow grease for these release agents is the restaurant industry. When this is the source, the yellow grease often contains variations in consistency and may also contain impurities which will serve to clog the application equipment. To complicate matters, yellow grease also brings with it an unpleasant smell. Accordingly, there is a need for a product that does not have problems with consistency, impurities, or odor.

The invention described herein is a mixture of two main ingredients: a natural oil and a surfactant. Although it is possible to use many different oils, natural oils are preferred. Examples of acceptable natural oils include soy bean oil, peanut oil, rapeseed oil, canola oil, palm oil, coconut oil, corn oil, cottonseed oil, olive oil, sesame oil, sunflower oil, safflower oil and vegetable oil. By using natural oils, the end product is non-hazardous and almost 100% biodegradable. Moreover, there is no unpleasant odor as there can be with yellow grease products. The invention is a mixture of one or more of these natural oils with a surfactant, such as one of the commercially available LUTENSOL® surfactants from the BASF Corporation. Optionally, non-hazardous additives may be used in order to provide additional benefits in the product's color or smell.

Other features and advantages of the present invention will become more apparent from the following description of the embodiments.

DETAILED DESCRIPTION OF THE INVENTION

The following description of the invention describes several exemplary embodiments of the invention, including preferred embodiments of the invention and how it may be practiced. It is to be understood that other embodiments may be utilized to practice the present invention and structural and functional changes may be made thereto without departing from the scope of the present invention.

The present invention is an industrial fluid comprised of a natural oil (such as crude degummed soy bean oil) and a surfactant. Exemplary natural oils that may be used include soy bean oil, peanut oil, rapeseed oil, canola oil, palm oil, coconut oil, corn oil, cottonseed oil, olive oil, sesame oil, sunflower oil, safflower oil and vegetable oil. In a preferred embodiment, the invention employs soy bean oil, and in a most preferred embodiment uses crude degummed soy bean oil.

The invention also incorporates a surfactant in the form of a polyethylene glycol ether. A suitable surfactant is found in the commercially available LUTENSOL® surfactant products, which are sold by the BASF Corporation of Florham Park, N.J. More particularly, the products that have been found to be suitable for use with this invention include the surfactants sold as LUTENSOL® XP 30, LUTENSOL® XP 40, LUTENSOL® XP 50, LUTENSOL® XP 60, LUTENSOL® XP 70, LUTENSOL® XP 79, LUTENSOL® XP 80, LUTENSOL® XP 89, LUTENSOL® XP 90, LUTENSOL® XP 99, LUTENSOL® XP 100, LUTENSOL® XP 140, LUTENSOL® XL 30, LUTENSOL® XL 40, LUTENSOL® XL 50, LUTENSOL® XL 60, LUTENSOL® XL 69, LUTENSOL® XL 70, LUTENSOL® XL 79, LUTENSOL® XL 80, LUTENSOL® XL 89, LUTENSOL® XL 90, LUTENSOL® XL 99, each of which are commercially available from BASF Corporation. A surfactant sold as LUTENSOL® is preferred because of its exemplary wetting properties. By mixing a natural oil with a wetting agent such as a surfactant sold as LUTENSOL®, the release agent is able to spread throughout the equipment to more effectively aid the release of mining material from the mining equipment.

A person of skill in the art would understand that other surfactants having similar properties to those listed above may also be suitable for use in this invention. Accordingly, it should be understood that those alternatives may be within the scope of the invention disclosed herein.

In some embodiments, the product incorporates non-hazardous additives that do not materially alter the non-stick properties of the invention described above. Typically, the additives would be a colorant or an odorant to impart a pleasant smell or coloring to the product. For example, one embodiment might incorporate peppermint oil to give the fluid a pleasant scent. In another embodiment, the fluid might incorporate blue food coloring to make the fluid stand out visually from other materials used in the mining operation. The examples of additives given here are illustrative, and are not intended to limit the invention.

Most commonly, the industrial fluid of this invention consists of between 1-25% by weight surfactant and 75-99% by weight natural oil. In a most preferred embodiment, the blend ratio of the present invention is 5% Lutensol® XP 80 and 95% crude degummed soy bean oil by weight. It has been found that refined soy bean oil lacks sufficient free fatty acids to provide the proper amount of viscosity for the slip coating of this invention. Crude degummed soy bean oil has been found to be superior in this respect, provide sufficient viscosity to enable the desired slip coating product. Additionally, while there are many Lutensol® brand products that provide sufficient wetting properties for the release agent, it has been found that the specific formulation of Lutensol® XP 80 provides the greatest benefit.

The fluid of the invention may be mixed using pumps which provide sufficient agitation to combine the soy bean oil (or other natural oil) and LUTENSOL® surfactant together. Alternatively, the oil scan be mixed together using mixers in large tanks. The physical and chemical properties of the invention in a preferred embodiment are shown in Table 1, below.

TABLE 1

| Physical and chemical properties of the invention | |
|---|---|
| Boiling Point | >212° F. (100° C.) |
| Freezing Point | −4° F. (−20° C.) |
| Specific gravity | .925 @ 68° F. (20° C.) |
| pH | 6.4 |

The physical properties shown in Table 1 illustrate the benefits of the present invention. Because the invention does not incorporate water, but is instead oil-based, it is capable of being used in the harsh environments often associated with the mining and mineral processing industries. With a freezing point of −4° F. (20° C.), the fluid is able to withstand much colder weather without freezing than would a water-based product. This is particularly useful in mountain-top mining operations or those operations in the remote northern or southern latitudes where sub-freezing temperatures are common.

Conversely, the invention's high boiling point also lends itself to use in extreme high temperatures environments that are often associated with mining and mineral processing. This is particularly true in mineral processing operations where ore is heated at some point during processing. Where a water-based product would boil away and be useless, the present invention is able to withstand these increased temperatures and continue to function as desired.

Similarly, because the invention is based on natural oils, the pH is only slightly acidic, which has health advantages where the product might come into contact with workers. Likewise, the product in this preferred embodiment is 99.8% biodegradable, which is advantageous to the ecology of the mining operation and its workers.

The invention claimed is:

1. A fluid for use in reducing adhesion of a mining material to mining equipment, comprising a mixture of:

a crude degummed soy bean oil having an elevated free fatty acid content relative to a refined soy bean oil; and polyethylene glycol ether surfactant, wherein the mixture is between 1-25% by weight surfactant, with the remainder of the fluid being a crude degummed soybean oil, and wherein the fluid has a freezing point of −20° C. and a boiling point of greater than 100° C.

2. The fluid of claim 1 wherein the mixture is about 5% polyethylene glycol ether surfactant and about 95% crude degummed soy bean oil by weight.

3. The fluid of claim 2 wherein the mixture is about 5% by weight of a nonionic polyethylene glycol ether surfactant sold under the trademark LUTENSOL surfactant and about 95% by weight crude degummed soy bean oil.

4. The fluid of claim 1 wherein the polyethylene glycol ether surfactant is a nonionic polyethylene glycol ether surfactant sold under the trademark LUTENSOL XP 80 surfactant.

5. The fluid of claim 1 wherein the polyethylene glycol ether surfactant is selected from the group consisting of a nonionic polyethylene glycol ether surfactant sold under the trademark LUTENSOL XP 30, a nonionic polyethylene glycol ether surfactant sold under the trademark LUTENSOL XP 40, a nonionic polyethylene glycol ether surfactant sold under the trademark LUTENSOL XP 50, a nonionic polyethylene glycol ether surfactant sold under the trademark LUTENSOL XP 60, a nonionic polyethylene glycol ether surfactant sold under the trademark LUTENSOL XP 69, a nonionic polyethylene glycol ether surfactant sold under the trademark LUTENSOL XP 70, a nonionic polyethylene glycol ether surfactant sold under the trademark LUTENSOL XP 79, a nonionic polyethylene glycol ether surfactant sold under the trademark LUTENSOL XP 80, a nonionic polyethylene glycol ether surfactant sold under the trademark LUTENSOL XP 89, a nonionic polyethylene glycol ether surfactant sold under the trademark LUTENSOL XP 90, a nonionic polyethylene glycol ether surfactant sold under the trademark LUTENSOL XP 99, LUTENSOL XP 100, a nonionic polyethylene glycol ether surfactant sold under the trademark LUTENSOL XP 140, a nonionic polyethylene glycol ether surfactant sold under the trademark LUTENSOL XL 99, a nonionic polyethylene glycol ether surfactant sold under the trademark LUTENSOL XL 90, a nonionic polyethylene glycol ether surfactant sold under the trademark LUTENSOL XL 89, a nonionic polyethylene glycol ether surfactant sold under the trademark LUTENSOL XL 89, a nonionic polyethylene glycol ether surfactant sold under the trademark LUTENSOL XL 80, a nonionic polyethylene glycol ether surfactant sold under the trademark LUTENSOL XL 79, a nonionic polyethylene glycol ether surfactant sold under the trademark LUTENSOL XL 70, a nonionic polyethylene glycol ether surfactant sold under the trademark LUTENSOL XL 69, a nonionic polyethylene glycol ether surfactant sold under the trademark LUTENSOL XL 60 surfactant, LUTENSOL XL 50, a nonionic polyethylene glycol ether surfactant sold under the trademark LUTENSOL XL 40, and a nonionic polyethylene glycol ether surfactant sold under the trademark LUTENSOL XL 30.

* * * * *